United States Patent
Chiang et al.

(10) Patent No.: US 9,261,763 B2
(45) Date of Patent: Feb. 16, 2016

(54) PICO PROJECTION FIXING MODULE

(71) Applicant: LITE-ON TECHNOLOGY CORPORATION, Taipei (TW)

(72) Inventors: Chi-Feng Chiang, Hsinchu (TW); Chuan Lee, Hsinchu (TW); Wei-Chih Lin, Hsinchu (TW); Fu-Ji Tsai, Hsinchu (TW); Liang-Tang Chen, Hsinchu (TW); Chih-Hao Lin, Hsinchu (TW); Wen-Chun Hsu, Hsinchu (TW); Chen-I Kuo, Hsinchu (TW)

(73) Assignee: LITE-ON TECHNOLOGY CORPORATION, Taipei (TW)

(*) Notice: Subject to any disclaimer, the term of this patent is extended or adjusted under 35 U.S.C. 154(b) by 56 days.

(21) Appl. No.: 14/217,638

(22) Filed: Mar. 18, 2014

(65) Prior Publication Data

US 2015/0185593 A1 Jul. 2, 2015

(30) Foreign Application Priority Data

Jan. 2, 2014 (CN) .......................... 2014 1 0004064

(51) Int. Cl.
*G03B 21/20* (2006.01)
*H04N 9/31* (2006.01)
*G03B 21/14* (2006.01)

(52) U.S. Cl.
CPC .............. *G03B 21/20* (2013.01); *G03B 21/142* (2013.01)

(58) Field of Classification Search
CPC ........... G03B 21/2013; G03B 21/2093; G03B 21/14; G03B 21/142; G03B 33/12; G03B 21/2066; G03B 21/20; H04N 9/3141; H04N 9/31; H04N 9/3111; F21Y 2101/02; F21Y 2113/005; F21V 5/00; F21V 5/007
USPC ......... 353/119, 102; 362/240, 311.02, 311.06
See application file for complete search history.

(56) References Cited

U.S. PATENT DOCUMENTS

| | | | |
|---|---|---|---|
| 2009/0190099 A1* | 7/2009 | Takahashi ............ | G02B 27/104 353/33 |
| 2010/0309439 A1* | 12/2010 | Bi ....................... | G03B 21/2033 353/33 |
| 2012/0249981 A1* | 10/2012 | Hirosawa ........... | G03B 21/2033 353/100 |
| 2013/0120719 A1* | 5/2013 | Lee ....................... | G02B 6/0006 353/97 |

* cited by examiner

*Primary Examiner* — William C Dowling
*Assistant Examiner* — Ryan Howard
(74) *Attorney, Agent, or Firm* — WPAT, PC; Justin King

(57) ABSTRACT

A pico projection fixing module includes a bracket main body, plural color light sources, and plural collimator lenses. The bracket main body includes plural assembling seats. The plural assembling seats are arranged side by side. Each of the plural assembling seats includes a first assembling part and a second assembling part beside the corresponding first assembling part. The plural color light sources are installed on the first assembling parts of the plural assembling seats, respectively. The plural collimator lenses are installed on the second assembling parts of the plural assembling seats and aligned with the plural color light sources, respectively. Moreover, plural color light beams from the plural color light sources are projected out through the corresponding collimator lenses. Moreover, plural concave spaces are arranged around bottoms of the plural second assembling parts, respectively, wherein the plural concave spaces are separated from each other.

8 Claims, 2 Drawing Sheets

US 9,261,763 B2

PICO PROJECTION FIXING MODULE

This application claims the benefit of People's Republic of China Patent Application No. 201410004064.9, filed Jan. 2, 2014, the subject matter of which is incorporated herein by reference.

FIELD OF THE INVENTION

The present invention relates to a pico projection fixing module, and more particularly to a pico projection fixing module with a special structure to prevent the adhesives for fixing the collimator lenses from adversely affecting or damaging other components in order to enhance the projecting performance.

BACKGROUND OF THE INVENTION

Projectors are widely used in many circumstances. Recently, with increasing development of science and technology, a pico projector (also referred as a micro display) has been introduced into the market. The pico projector is designed to have small size and light weightiness. Generally, the pico projector is embedded into a portable electronic device (e.g. a mobile phone or a personal digital assistant), so that the pico projector may be directly utilized. Alternatively, the pico projector is separated from the portable electronic device, and thus the pico projector may be operated after the pico projector is in communication with the portable electronic device. By means of the pico projector, a corresponding projection image may be projected on a flat projection surface to be viewed by the user. In such way, the image to be shown may be projected in a maneuverable and real-time manner.

Generally, the pico projector uses light sources to emit light beams, and projects the light beams on the projection surface through a projection module. In a conventional pico projector, the projection module is for example an LCoS (liquid crystal on silicon) panel, a reflective LCD (liquid crystal display) panel, a DMD (digital Micro-mirror device) or a micro scanning mirror (i.e. according to a MEMS technology). Before the light beams are projected out through the projection module, the light beams are homogenized, focused or shaped by associated optical elements of the pico projector. After the light beams are homogenized, focused or shaped, the adjusted light beams are projected out. Generally, the light sources used in the pico projector are for example LED light sources or laser light sources.

FIG. 1 is a schematic planar view illustrating a portion of a conventional pico projector. As shown in FIG. 1, the conventional pico projector 1 comprises three primary color light sources 11, 12 and 13. For example, the color light source 11 is a red light source, the color light source 12 is a green light source, and the color light source 13 is a blue light source. The three primary color light sources 11, 12 and 13 are laser light sources. The pico projector 1 further comprises three collimator lenses 110, 120 and 130 corresponding to the three primary color light sources 11, 12 and 13, respectively. The color light beams from the three primary color light sources 11, 12 and 13 are adjusted by the collimator lenses 110, 120 and 130. The pico projector 1 further comprises two dichroic mirrors 141 and 142. The color light beams from the three primary color light sources 11, 12 and 13 are selectively transmitted through or reflected by the dichroic mirrors 141 and 142, so that the three color light beams are mixed with each other. Afterwards, the mixed light beam is converted into a scanning line by a scanning mirror 15. The scanning line is swept across projection surface along a horizontal axis and a vertical axis in order to produce a planar image on the projection surface.

For assembling the conventional pico projector 1, the color light sources 11, 12 and 13 and the scanning mirror 15 are firstly fixed on predetermined position, and then the three collimator lenses 110, 120 and 130 are fixed on positions corresponding to the color light sources 11, 12 and 13. For achieving an optimal projecting performance, the positions of three collimator lenses 110, 120 and 130 should be elaborately determined to adjust the angles of the color light beams and mix the color light beams. For example, after UV curing adhesives are coated on the predetermined positions of the three collimator lenses 110, 120 and 130, the three collimator lenses 110, 120 and 130 are placed on the predetermined positions, and then the UV curing adhesives are exposed to UV light. After the UV curing adhesives are solidified, the three collimator lenses 110, 120 and 130 are securely fixed on the predetermined positions.

However, the conventional pico projector still has some drawbacks. For example, specified spaces should be retained at the positions near the collimator lenses 110, 120 and 130. These spaces are open to each other and in communication with each other in order for the manufacturer to assemble, install or adjust the collimator lenses 110, 120 and 130. That is, these collimator lenses 110, 120 and 130 are not separated from each other in the space. Moreover, the scanning mirror 15 or other optical elements are all in these spaces which are in communication with each other.

During the process of dispensing adhesives, some drawbacks may occur. Before the adhesives are solidified, the adhesives have flowability. Once the adhesives flow to other components, these components are adversely affected. Moreover, when the color light beams from the color light sources 11, 12 and 13 are directed to these open spaces, the scattering phenomenon or the diffusion phenomenon of the color light beams may be interfered with each other. Under this circumstance, the projection image contains obvious stray light.

SUMMARY OF THE INVENTION

The present invention provides a pico projection fixing module. The pico projection fixing module comprises a bracket main body with a special structure. The adhesives for fixing the collimator lenses will not flow to other components to adversely affect or damage other components. Consequently, the projecting performance of the pico projector with the pico projection fixing module is largely enhanced.

An embodiment of the present invention provides a pico projection fixing module for a pico projector. The pico projection fixing module includes a bracket main body, plural color light sources, and plural collimator lenses. The bracket main body includes plural assembling seats. The plural assembling seats are arranged side by side. Each of the plural assembling seats includes a first assembling part and a second assembling part, and the second assembling part is located beside the corresponding first assembling part. The plural color light sources are installed on the first assembling parts of the plural assembling seats, respectively. The plural collimator lenses are installed on the second assembling parts of the plural assembling seats and aligned with the plural color light sources, respectively. Moreover, plural color light beams from the plural color light sources are projected out through the corresponding collimator lenses. Moreover, plural concave spaces are arranged around bottoms of the plural second assembling parts, respectively, wherein the plural concave spaces are separated from each other.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
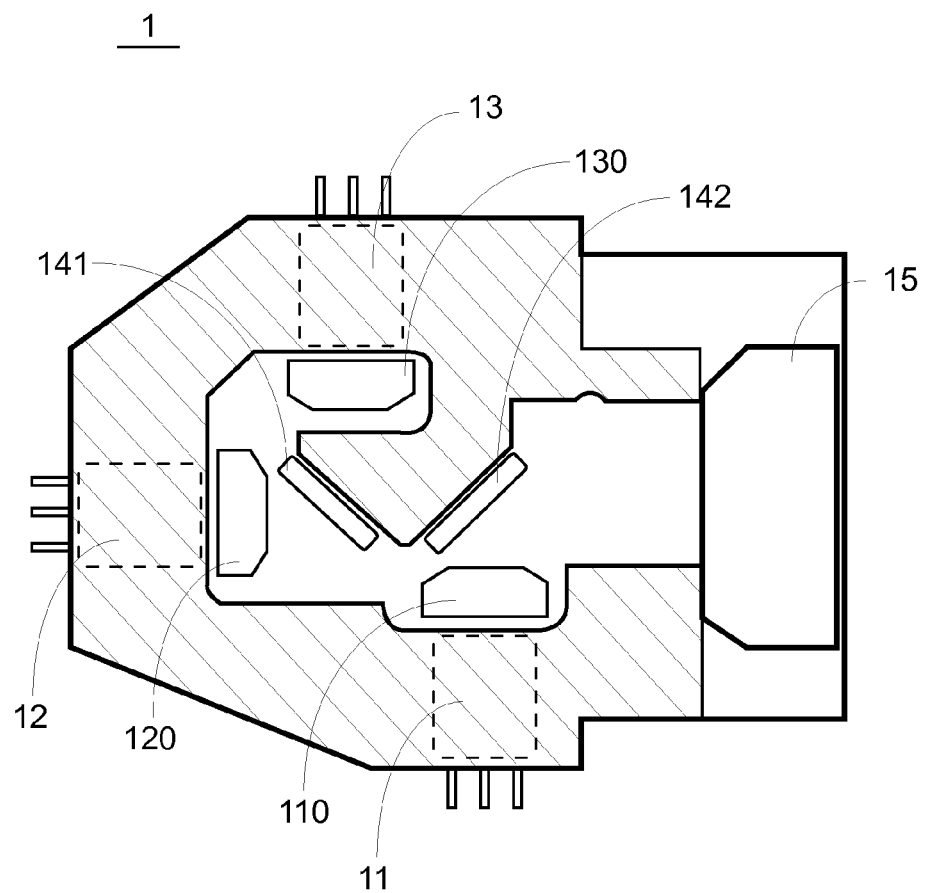
FIG. 1 (prior art) is a schematic planar view illustrating a portion of a conventional pico projector.
Figure 2:
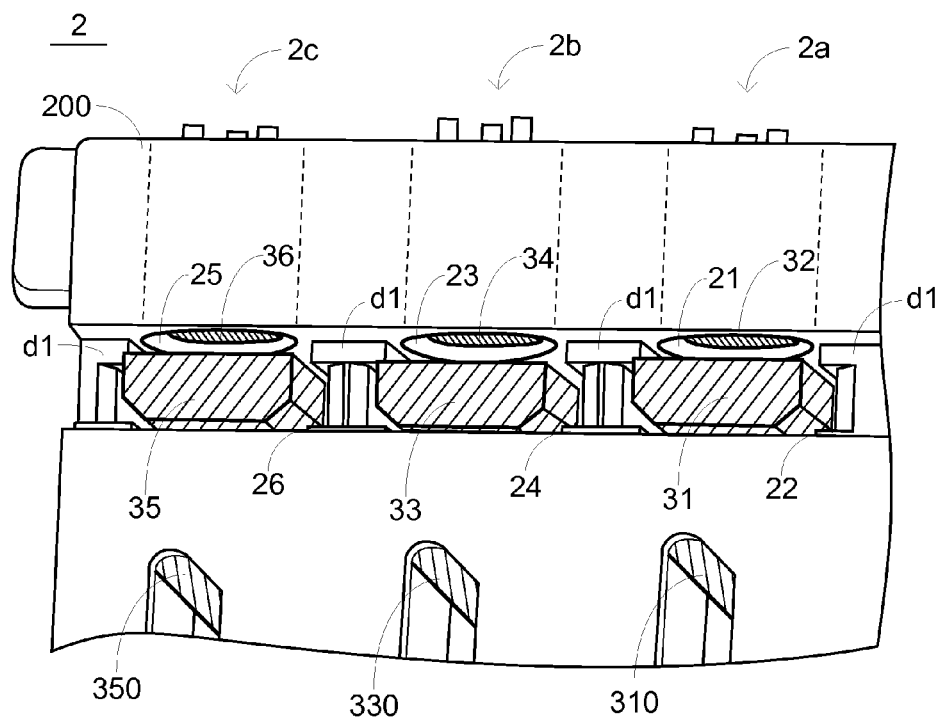
FIG. 2 is a schematic top view illustrating a pico projection fixing module according to an embodiment of the present invention.

FIG. 2 is a schematic top view illustrating a pico projection fixing module according to an embodiment of the present invention. As shown in FIG. 2, the pico projection fixing module 2 comprises a bracket main body 200. The bracket main body 200 is substantially a rectangular frame. Moreover, the bracket main body 200 comprises plural assembling seats 2a, 2b and 2c. These assembling seats 2a, 2b and 2c are arranged side by side. For clarification, three assembling seats are illustrated in this embodiment.

Moreover, the pico projection fixing module 2 is applied to a pico projector. That is, the pico projection fixing module 2 further comprises plural collimator lenses and plural color light sources. The number of the collimator lenses and the number of the color light sources are both equal to the number of the assembling seats 2a, 2b and 2c. In this embodiment of FIG. 2, the pico projection fixing module 2 comprises three collimator lenses 31, 33 and 35 and three color light sources 32, 34 and 36 corresponding to the assembling seats 2a, 2b and 2c.

In this embodiment, the color light sources 32, 34 and 36 are laser light sources for emitting a red light beam, a green light beam and a blue light beam (i.e. three primary color light beams RGB). It is noted that the number of the color light sources are not restricted to three. For example, in some other embodiments, the pico projection fixing module 2 comprises four light sources RGGB and four assembling seats.

Figure 3:
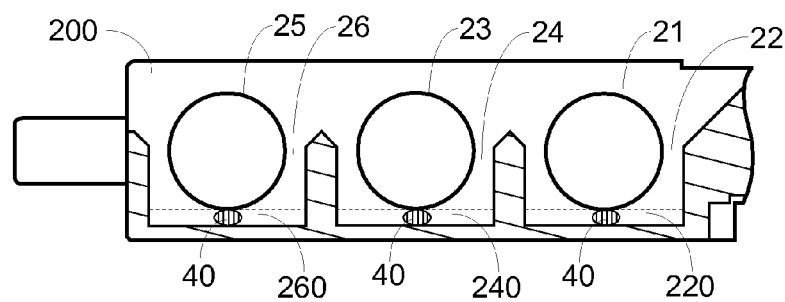
FIG. 3 is a schematic cross-sectional view illustrating a bracket main body of the pico projection fixing module of FIG. 2.

FIG. 3 is a schematic cross-sectional view illustrating the bracket main body of the pico projection fixing module of FIG. 2. The structure, assembling process and the installing process of the pico projection fixing module 2 will be illustrated with reference to FIGS. 2 and 3. In particular, the assembling seat 2a comprises a first assembling part 21 and a second assembling part 22 beside the first assembling part 21; the assembling seat 2b comprises a first assembling part 23 and a second assembling part 24 beside the first assembling part 23; and the assembling seat 2c comprises a first assembling part 25 and a second assembling part 26 beside the first assembling part 25.

Please refer to FIGS. 2 and 3 again. The color light sources 32, 34 and 36 are installed on the first assembling parts 21, 23 and 25 and aligned with the collimator lenses 31, 33 and 35, respectively. In this embodiment, the first assembling parts 21, 23 and 25 are cylindrical openings that are formed in the bracket main body 200 and arranged behind the second assembling parts 22, 24 and 26, respectively. Moreover, the space sizes enclosed by the first assembling parts 21, 23 and 25 match the color light sources 32, 34 and 36, respectively.

The collimator lenses 31, 33 and 35 are installed on the second assembling parts 22, 24 and 26, respectively. In this embodiment, the second assembling parts 22, 24 and 26 are concave structures. The shapes and sizes of the second assembling parts 22, 24 and 26 match the collimator lenses 31, 33 and 35, respectively. Moreover, the front sides and the rear sides of the second assembling parts 22, 24 and 26 are hollow. Consequently, the color light beams from the color light sources 32, 34 and 36 may be introduced into the collimator lenses 31, 33 and 35. After the color light beams are adjusted by the collimator lenses 31, 33 and 35, the adjusted color light beams are projected out.

In this embodiment, the second assembling parts 22, 24 and 26 are respectively separated from lateral sides of the first assembling parts 21, 23 and 25 by a partition structure d1. Consequently, there are enough leeway spaces for assembling and adjusting the collimator lenses 31, 33 and 35. From the viewpoint of FIG. 2, the front edges of the color light sources 32, 34 and 36 are viewable. The size of the partition structure d1 may be determined according to the projection requirement or the production precision. However, as the partition structure d1 is decreased, the efficacy of adjusting the color light beams is increased.

In this embodiment, the assembling seats 2a, 2b and 2c are arranged side by side. Consequently, the color light beams from the color light sources 32, 34 and 36 are directed along the same direction, or the color light beams from the color light sources 32, 34 and 36 may be adjusted as parallel light beams by the collimator lenses 31, 33 and 35 to be projected out. In accordance with the present invention, the procedure of assembling the color light sources 32, 34 and 36 is prior to the procedure of assembling the collimator lenses 31, 33 and 35.

Please refer to FIG. 3 again. In accordance with a feature of the present invention, sealed concave spaces 220, 240 and 260 are arranged around the bottoms of the second assembling parts 22, 24 and 26, respectively. These concave spaces 220, 240 and 260 are separated from each other. In particular, the second assembling parts 22, 24 and 26 are concave structures in the bracket main body 200, and part region of the front sides and part region of the rear sides of the second assembling parts 22, 24 and 26 are hollow. Consequently, the color light beams from the color light sources 32, 34 and 36 may be transmitted through the second assembling parts 22, 24 and 26. However, the concave spaces 220, 240 and 260 around the bottoms of the second assembling parts 22, 24 and 26 have specified capacity.

Please refer to FIG. 3 again. Moreover, the collimator lenses 31, 33 and 35 may be respectively fixed on the second assembling parts 22, 24 and 26 through adhesives 40. For example, the adhesives 40 are UV curing adhesives. After the adhesives 40 are dispensed on the predetermined positions and the collimator lenses 31, 33 and 35 are adjustably installed on the predetermined positions, the UV curing adhesives are exposed to UV light. After the UV curing adhesives 40 are solidified, the collimator lenses 31, 33 and 35 are securely fixed on the predetermined positions. Since the sealed concave spaces 220, 240 and 260 are arranged around the bottoms of the second assembling parts 22, 24 and 26, the unsolidified adhesives 40 can be confined within the sealed concave spaces 220, 240 and 260. Under this circumstance, since the unsolidified adhesives 40 will not flow to other components, these components are not adversely affected.

In accordance with another feature of the present invention, the first assembling parts 21, 23 and 25 are separated from each other in the space. In particular, the first assembling parts 21, 23 and 25 are cylindrical openings that are formed in the bracket main body 200, and no other perforations are formed between the first assembling parts 21, 23 and 25. Consequently, the first assembling parts 21, 23 and 25 are isolated and separated from each other. Under this circumstance, the majorities of the color light sources 32, 34 and 36 within the first assembling parts 21, 23 and 25 are sheltered.

Since these first assembling parts 21, 23 and 25 are separated from each other and the bilateral sides of the collimator lenses 31, 33 and 35 are enclosed by the concave structures of the second assembling parts 22, 24 and 26 and the partition structures d1, these assembling seats 2a, 2b and 2c are separated from each other. Consequently, the scattering phenomenon or the diffusion phenomenon of the color light beams from the color light sources 32, 34 and 36 will be isolated and not be interfered with each other. More especially, since the bracket main body 200 is made of an opaque material, the possibility of causing interference between the color light beams from the color light sources 32, 34 and 36 will be minimized or eliminated. Under this circumstance, the performance of the projection image is enhanced.

As shown in FIG. 2, the pico projection fixing module 2 further comprises plural dichroic mirrors 310, 330 and 350. The dichroic mirrors 310, 330 and 350 are aligned with the collimator lenses 31, 33 and 35, respectively. That is, the dichroic mirrors 310, 330 and 350 are located at the front sides of the second assembling parts 22, 24 and 26, respectively. The color light beams from the color light sources 32, 34 and 36 are selectively transmitted through or reflected by the dichroic mirrors 310, 330 and 350, so that the three color light beams are mixed with each other and projected out along the same direction.

From the above descriptions, the present invention provides a pico projection fixing module. The adhesives for fixing the collimator lenses are received with the concave structures. Consequently, before the adhesives are solidified, the adhesives will not flow to other components to adversely affect or damage other components. In other words, the projecting performance is largely enhanced. Moreover, the pico projection fixing module is effective to minimize the interference between the color light beams from the color light sources.

Consequently, the pico projection fixing module of the present invention can enhance the projecting performance while eliminating the drawbacks of the conventional pico projector.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pico projection fixing module for a pico projector, the pico projection fixing module comprising:
    a bracket main body comprising plural assembling seats, wherein the plural assembling seats are arranged side by side, wherein each of the plural assembling seats comprises a first assembling part and a second assembling part, and the second assembling part is located beside the corresponding first assembling part;
    plural color light sources installed on the first assembling parts of the plural assembling seats, respectively;
    plural dichroic mirrors located at front sides of the plural second assembling parts, respectively; and
    plural collimator lenses installed on the second assembling parts of the plural assembling seats and aligned with the plural color light sources, respectively, wherein plural color light beams from the plural color light sources are projected out through the corresponding collimator lenses and are selectively transmitted through or reflected by the plural dichroic mirrors,
    wherein plural concave spaces are arranged around bottoms of the plural second assembling parts, respectively, wherein the plural concave spaces are separated from each other.

2. The pico projection fixing module as claimed in claim 1, wherein the plural first assembling parts are openings formed in the bracket main body, and the plural first assembling parts are separated from each other.

3. The pico projection fixing module as claimed in claim 1, wherein the plural collimator lenses are fixed on the corresponding second assembling parts through adhesives, wherein the adhesives are confined within the concave spaces of the corresponding second assembling parts.

4. The pico projection fixing module as claimed in claim 3, wherein the adhesives are UV curing adhesives.

5. The pico projection fixing module as claimed in claim 1, wherein the color light beams from the color light sources are a red light beam, a green light beam and a blue light beam.

6. The pico projection fixing module as claimed in claim 1, wherein the color light sources are laser light sources.

7. The pico projection fixing module as claimed in claim 1, wherein the plural color light beams from the plural color light sources are directed along the same direction, or the plural color light beams from the plural color light sources are adjusted as parallel light beams by the plural collimator lenses.

8. The pico projection fixing module as claimed in claim 1, wherein the plural second assembling parts are respectively separated from lateral sides of the first assembling parts by partition structures.

* * * * *